US009937595B2

(12) United States Patent
Hediger

(10) Patent No.: US 9,937,595 B2
(45) Date of Patent: Apr. 10, 2018

(54) COUPLING DEVICE FOR A MANIPULATOR

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 369 days.

(21) Appl. No.: 14/623,229

(22) Filed: Feb. 16, 2015

(65) Prior Publication Data
US 2015/0258647 A1    Sep. 17, 2015

(30) Foreign Application Priority Data

Mar. 11, 2014 (CH) .......................... 363/14

(51) Int. Cl.
B23Q 1/00      (2006.01)
B25J 15/04     (2006.01)
B25J 17/00     (2006.01)

(52) U.S. Cl.
CPC ........ *B23Q 1/0072* (2013.01); *B25J 15/0408* (2013.01); *B25J 17/00* (2013.01); *Y10T 403/7066* (2015.01)

(58) Field of Classification Search
CPC ............................ B23Q 1/0072; B25J 15/0408
See application file for complete search history.

(56) References Cited

U.S. PATENT DOCUMENTS 4,863,323 A * 9/1989 Glaser ................. B23B 31/1071
                                                        279/2.11
4,906,123 A * 3/1990 Weskamp ............ B23Q 1/0063
                                                        403/322.2
5,173,017 A * 12/1992 Oshnock ............... B23B 29/046
                                                        279/2.23
5,211,501 A * 5/1993 Nakamura ............... B25J 15/04
                                                        403/322.3
5,415,066 A * 5/1995 Erickson ............... B23B 29/046
                                                        408/239 R (Continued)

FOREIGN PATENT DOCUMENTS

EP    1 970 170 A1    9/2008
FR    2578775 A1      9/1986

(Continued)

OTHER PUBLICATIONS

German Search Report (2 pages).

*Primary Examiner* — James M Ference
*Assistant Examiner* — Kyle J. Walraed-Sullivan
(74) *Attorney, Agent, or Firm* — Maginot, Moore & Beck, LLP

(57) ABSTRACT

The coupling device (1) comprises a clamping fixture (2) fixable to a manipulator and an adapter (40) securely clampable thereto. Both the clamping fixture (2) and the adapter (40) are configured substantially rectangular. The clamping fixture (2) comprises a locking mechanism (5) consisting of two laterally shiftable locking elements (6, 7) and an actuating member (8) disposed inbetween. For fixedly securing the adapter (40) to the clamping fixture (2) the locking elements (6, 7) are urged by means of the actuating member into the side widenings (45, 46) of the locking opening (44). In addition, the clamping fixture (2) is provided with a slotted recess (4) and the adapter (40) with an elongated base (41), the latter being insertable into the slotted recess (4).

18 Claims, 5 Drawing Sheets

(56) References Cited

U.S. PATENT DOCUMENTS

| | | | | |
|---|---|---|---|---|
| 5,452,631 A * | 9/1995 | Erickson | | B23B 29/046 409/234 |
| 5,870,935 A * | 2/1999 | Erickson | | B23B 29/046 279/2.11 |
| 5,918,870 A * | 7/1999 | Stark | | B23B 31/1071 269/309 |
| 5,927,168 A * | 7/1999 | Needham | | B23B 29/046 279/75 |
| 6,000,306 A * | 12/1999 | Erickson | | B23B 29/046 409/233 |
| 6,101,888 A * | 8/2000 | Yonezawa | | B25B 5/06 269/138 |
| 6,485,214 B2 * | 11/2002 | Schill | | B23B 29/046 269/309 |
| 6,511,100 B1 * | 1/2003 | Le Clinche | | F16L 37/23 285/314 |
| 6,604,738 B2 * | 8/2003 | Haruna | | B23Q 1/0072 269/309 |
| 8,005,570 B2 * | 8/2011 | Gloden | | B23B 31/1071 403/31 |
| 8,533,930 B2 * | 9/2013 | Norton | | B23B 31/22 279/2.12 |
| 8,534,951 B2 * | 9/2013 | Komine | | F16C 11/106 248/288.51 |
| 8,585,031 B2 * | 11/2013 | Stark | | B23Q 1/0072 269/309 |
| 8,601,918 B2 * | 12/2013 | Erickson | | B23B 29/046 82/158 |
| 8,794,418 B1 * | 8/2014 | Norton | | B25J 17/0208 192/150 |
| 8,844,942 B1 * | 9/2014 | Landowski | | B25G 3/12 279/22 |
| 2002/0067045 A1 * | 6/2002 | Blanchard | | F16B 19/109 292/252 |
| 2004/0161313 A1 * | 8/2004 | Nordlin | | B23B 31/1071 408/204 |
| 2006/0186591 A1 * | 8/2006 | Yonezawa | | B23B 31/1071 269/309 |
| 2007/0063403 A1 * | 3/2007 | Stark | | B23Q 1/0072 269/309 |
| 2007/0063404 A1 * | 3/2007 | Stark | | B23Q 1/0072 269/309 |
| 2007/0158891 A1 * | 7/2007 | Stark | | B23Q 1/0072 269/309 |
| 2007/0210501 A1 * | 9/2007 | Stark | | B23B 31/1071 269/309 |
| 2007/0235949 A1 * | 10/2007 | Gloden | | B23B 31/1071 279/2.12 |
| 2009/0060644 A1 * | 3/2009 | Blanchard | | A01B 33/028 403/321 |
| 2010/0219574 A1 * | 9/2010 | Stark | | B23Q 1/0072 269/309 |

FOREIGN PATENT DOCUMENTS

| | | |
|---|---|---|
| JP | H0230483 A | 1/1990 |
| JP | H0661486 U | 8/1994 |
| JP | H07246584 A | 9/1995 |
| JP | H07290392 A | 11/1995 |

* cited by examiner

COUPLING DEVICE FOR A MANIPULATOR

The invention relates to a coupling device for a manipulator. Such coupling devices comprise a clamping fixture and an adapter securable thereto. The clamping fixture is usually secured to a manipulator such as a robotic device, for example, whilst the adapter is secured to a tool or workpiece—pallet—which can then be securely clamped to the clamping fixture by means of the adapter repeatedly precisely positioned.

Known from EP 1 707 307 is a generic coupling device termed a quick clamping system and comprising a mount and a pin for secure clamping. The quick clamping system comprises a round housing provided with a centrally arranged clamping mount. For securely clamping the pin radially shiftable spools are provided. The pin features a circumferential groove engaging lugs located radially internally on the spools for securing the pin in place. Actuating the pins is done by means of a spring-loaded piston for which purpose the cited piston features positioners in the form of cylindrical pins which engage skew guides by irregular guide contours of the spools so that axial travel of the piston results in radial travel of the spools. Due to the round design of this quick clamping system it takes up relatively much space, especially in its height, resulting in especially pallets which are usually low profile being significantly exceeded in height by the quick clamping system which can prove a nuisance when machining workpieces clamped to the pallet.

JP 3419543B2 describes a coupling device for robotic devices featuring a base body and an adapter for fixedly securing thereto. The base body is provided with a clamping fixture comprising two side pistons and rods connected thereto for actuating pins. The pins are guided in recesses. The adapter in turn is provided with hook-shaped side pistons in which recesses are machined into which the two pins can be laterally pressed into place. In addition the base body features a central piston and a rod connected thereto. Arranged at the end of the rod is actuating cam rendered rotatable by means of two levers. The levers in turn are coupled by means of cams with two fingers which can be laterally shifted to and fro by rotation of the cams. Thus each locking element is assigned a separate actuating member.

Known from EP 1 970 170 A1 is a coupling device for a robotic arm. The device comprises an adapter for the robotic arm and an adapter for the pallet. The adapter for the robotic arm features a cylindrically configured ball lock, the balls of which engage a mount arranged at the adapter for the pallet, a cylinder being provided for actuating the balls.

Disclosed in JP 3419543 B2 is a coupling device for robotic devices featuring a base body and an adapter for fixedly securing thereto. The base body is provided with a clamping fixture comprising two side pistons and rods connected thereto for actuating pins. The pins are guided in recesses. The adapter in turn is provided with hook-shaped side pistons in which recesses are machined into which the two pins can be laterally pressed into place. In addition the base body features a central piston and a rod connected thereto. The levers in turn are coupled by means of cams with two fingers which can be laterally shifted to and fro by rotation of the cams. Thus each locking element is assigned a separate actuating member.

Known in conclusion from EP 1 970 A1 is a coupling device for a robotic arm. The device comprises an adapter for the robotic arm and an adapter for the pallet. The adapter for the robotic arm features a cylindrically configured ball lock, the balls of which engage a mount arranged at the adapter for the pallet, a cylinder being provided for actuating the balls. This document thus discloses a conventional ball lock.

The object of the invention is to create a coupling device for a manipulator in the technical field as cited at the outset which whilst having a relatively low profile is nevertheless rugged and capable of handling heavy weights.

How this object is achieved is defined by the features of claim 1. In accordance with the invention the coupling device as well as the adapter now feature an elongated, particularly rectangular basic shape, the adapter featuring a locking opening provided with side widenings and the locking mechanism having two laterally shiftable locking elements and an actuating member disposed inbetween, by means of which the locking elements are insertable in the side widenings of the locking opening such that the adapter is fixedly securable to the clamping fixture.

Such a coupling device is particularly suitable for coupling/decoupling pickers and pallets to a manipulator such as for example, a robotic device. Due to the elongated design of the clamping fixture together with an adapter comprising a locking opening with side widenings engaging two laterally shiftable locking elements this now satisfies the basic requirement of creating a relatively low profile coupling device which is nevertheless still capable of handling high weights.

Preferably the locking mechanism is arranged in the middle of the clamping fixture whilst the locking opening is arranged in the middle of the adapter. Such a configuration now makes for a simple and symmetrical configuration of the clamping fixture.

In one particularly preferred aspect the adapter is configured in one piece, this now making it possible to engineer the adapter highly rugged whilst making it available at low cost.

In another preferred embodiment of the coupling device the locking mechanism is arranged centrally in a slotted recess of the clamping fixture and the adapter is provided with an elongated base into which the cited locking opening is machined, the base of the adapter being designed for insertion into the cited recess of the clamping fixture. A slotted recess of this kind forms an ideal means of mounting the adapter or the base thereof.

In a further preferred embodiment the slotted recess of the clamping fixture is defined top and bottom by a ledge, each of which is machined with a guide slot for lateral travel guidance of the locking elements, it being relatively simple to machine the guide slots in each ledge.

In yet another preferred embodiment the clamping fixture as well as the adapter are at least twice as wide as they are high and a centering pin is arranged on the clamping fixture on each side of the locking mechanism, each centering pin being designed to cooperate with one opening each correspondingly on the basis of the adapter. In this configuration the centering pins can be arranged relatively far apart which affords advantages both as regards the stability as well as the positioning accuracy.

In still a further preferred embodiment the adapter is configured cross-sectionally substantially T-shaped and comprises two legs extending from the base at right angles. Such an adapter is stable and cost effective in production.

In another preferred embodiment the rear side of each leg facing the base forms an abutment face for contacting the adapter on being clamped to the end face of the clamping fixture. With this configuration the legs of the adapter can be used as stops which as regards cost effective production is of advantage.

In yet another preferred embodiment the adapter is provided in the transitional portion from the base to each leg with a protuberance, these protuberances being matched to the slotted recess of the clamping fixture such that the adapter on being securely clamped to the clamping fixture is mounted in the slotted recess in a neat fit vertically. This configuration is of advantage when heavy loads are involved, since a portion of the forces transmitted from the adapter to the clamping fixture can be transmitted via these protuberances.

In yet a further preferred embodiment the actuating member is shiftable between a retracted basic position and an advanced active position, in the advanced active position being designed to urge the two locking elements into the side widenings of the locking opening such that the locking elements are in positive and/or non-positive contact with the clamping faces partly defining the side widenings. Achieving such a locking mechanism is both simple and cost effective.

In still a further preferred embodiment the actuating member is configured wedge-shaped in featuring two conically tapered side faces, each locking element being provided at the side facing the actuating member with flat pressure face matching the assigned side face of the actuating member, the spacing and angle between the two side faces of the actuating member being selected so that that in the advanced active position of the actuating member a self-locking effect is achieved between the actuating member and the locking elements in contact with the clamping faces of the adapter. Such a configuration is especially of advantage as regards high operating safety since the locking mechanism after advancement of the actuating member is locked in place and, for example, even a power outage or a leak in the feeder would have no effect on the safe securement of the adapter at the clamping fixture.

In another preferred embodiment each locking element is configured substantially cylindrically, each shell face is provided with a flat pressure face matching the clamping faces of the adapter. Here again, such a locking element is simple and cost effective to produce and is capable of handling heavy locking forces.

Preferably each locking element of the clamping fixture is assigned at least one spring-loaded means by means of which each locking element is biased in the direction of the actuating member in thus making it sure that each locking element after retraction of the actuating member is shifted into its internally positioned concentrated basic position so that the adapter can be removed from the clamping fixture.

It is particularly preferred that the locking mechanism comprises a spring-loaded clamping piston coupled to the actuating member in urging it into the active position by the effect of the pressure springs. This additionally assures a reliable locking of the adapter to the clamping fixture, since the pressure springs urge the actuating member in the direction of the advanced active position.

In a further preferred embodiment the clamping piston is designed to overcome the spring-loaded force by pneumatic, electrical or hydraulic means to achieve its starting position. These are preferred means of urging the clamping piston into its starting position in thus overcoming the locking action.

In a particularly preferred further embodiment the clamping faces of the adapter partly defining the side widenings are angled relative to the direction of movement of the actuating member such that the adapter on being secured to the clamping fixture is advanced to the clamping fixture by the locking element in contact with the clamping faces of the adapter. This configuration causes the adapter on being securely clamped in place not only to be fixed in place but simultaneously also advanced to the clamping fixture.

In another preferred embodiment the clamping faces of the adapter are angled between 30° and 60°, particularly between 40° and 50° relative to the direction in which the actuating member is shifted. This permits utilizing the axial movement of the actuating member to particular advantage in fetching the adapter for fixedly securing it to the clamping fixture.

The invention will now be detailed with reference to the drawings in which.

Note that like parts in the FIGs. are identified by like reference numerals.

Figure 1:
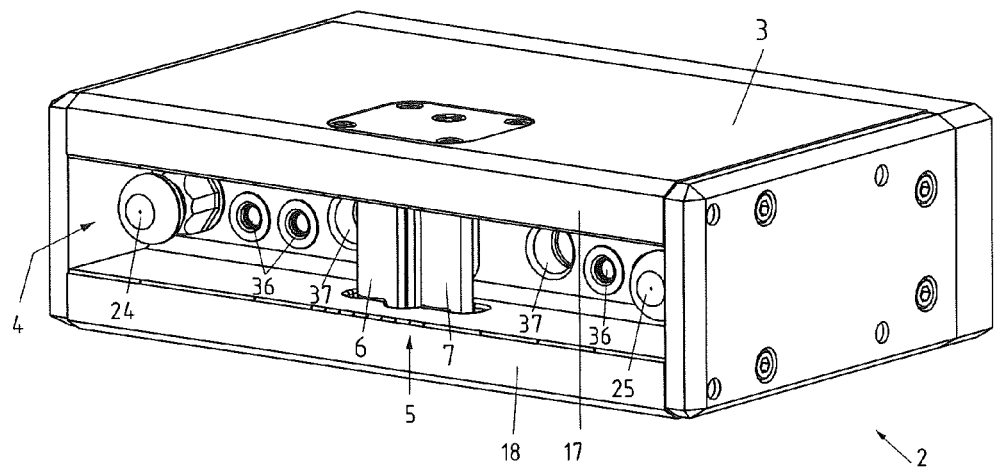
FIG. 1 is a view in perspective of a coupling device consisting of a clamping fixture and an adapter.
Figure 1:
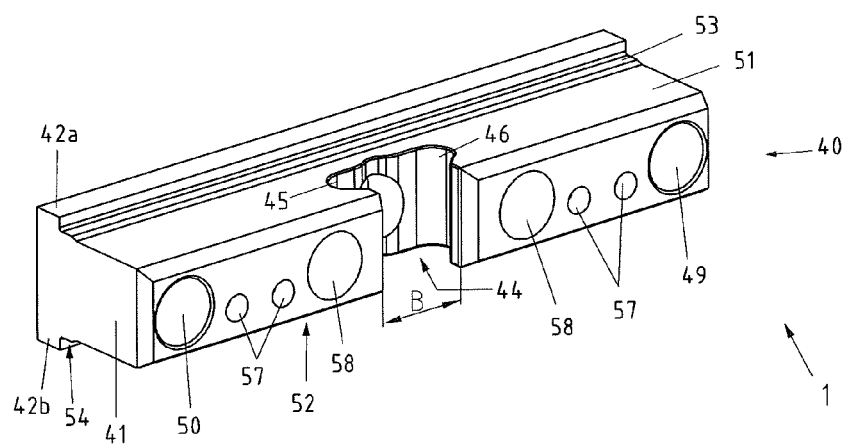

Referring now to FIG. 1 there is illustrated a coupling device 1 for a manipulator comprising a clamping fixture 2 and an adapter 40. The clamping fixture 2 is usually fixedly secured to a manipulator such as, for example, a robotic device or robotic arm whilst the adapter 40 is arranged, for instance, on a picker or a tooling/workpiece pallet. By means of the adapter 40 the picker or the pallet can be repeatedly fixedly located relative to the clamping fixture 2 precisely. The adapter 40 shown in a front view is usually secured by its rear face to the pallet or picker. Both the clamping fixture 2 as well as the adapter 40 are basically configured elongated, preferably substantially rectangular. An elongated basic configuration of the clamping fixture 2 as compared to round clamping faces, has particularly the advantage that they have a lower profile in thus being particularly suitable also for flat pallets. The clamping fixture 2 as well as the adapter 40 are preferably configured at least twice as wide as high, especially at least 2.5 times wide as high.

The clamping fixture 2 comprises a basic housing 3 fronted by a slotted recess 4. The slotted recess 4 is defined top and bottom by a ledge 17, 18. Arranged within this slotted recess 4 is a locking mechanism 5 featuring two laterally shiftable locking elements 6, 7 and an actuating member disposed centrally inbetween (not shown in FIG. 1) In this arrangement the locking mechanism 5 is arranged in the middle, i.e. in the middle of the clamping fixture 2. The two locking elements 6, 7 are depicted in the basic concentrated position. Arranged within the slotted recess 4 additionally are two centering pins 24, 25 serving to position the adapter 40 on being fixedly clamping to the clamping fixture 2. Merging in the slotted recess 4 are connections 36 for transmitting signals or media from the clamping fixture 2 to the adapter 40 or the pallet connected thereto. Provided in addition within the slotted recess 4 are drillings 37 which are particularly of use in contact with narrow adapters (not shown) by these being utilized as centering holes for cylindrical pins arranged on a narrow adapter.

The adapter 40 configured in one piece is cross-sectionally essentially T-shaped with an elongated, ledge-type base 41 and two legs 42a, 42b extending at right angles there-from. Machined in the base 41 of the adapter is a locking opening 44 provided with two side widenings 45, 46 matching in shape and location to the locking elements 6, 7 of the clamping fixture 2. The locking opening 44 is arranged in the middle on the adapter 4. So that the locking elements 6, 7 in the concentrated basic position can be inserted in the locking opening 44 of the adapter 40 the width B of the locking opening 44 in the insertion portion is greater than the outer spacing between the two locking elements 6, 7 in the concentrated condition. The adapter 40 is provided with five larger drillings 49, 50, 58, 59, 60 and four smaller drillings 57. The five larger drillings 49, 50, 58, 59, 60 serve to receive screws (not shown) by means of which the adapter 40 can be secured to a pallet (not shown). The two outer drillings 49, 50 serve at the same time also as centering holes by being matched to the centering pins 24, 25 of the clamping fixture 2. The four smaller drillings 57 serve to conduct electrical wiring or media such as compressed air, etc from the manipulator to the pallet connected to the adapter 40 and vice-versa.

The base 41 of the adapter 40 is provided top and bottom each with a flat face 51, 52, said flat faces 51, 52 being oriented parallel to each other. Provided at the transition of each flat face 51, 52 to each leg 42a, 42b is a protuberance 53, 54 in the form of a heel. The vertical spacing between the two protuberances 53, 54 is adapted to the height of the slotted recess 4 of the clamping fixture 2 such that the adapter 40 after being fixedly secured to the clamping fixture 2 is seated in the slotted recess 4 has a slight clearance vertically ranging from approx. 0.05 to 0.3 mm. The adapter 40 is shaped and configured to be very rugged and can be produced at relatively low cost.

Figure 2:
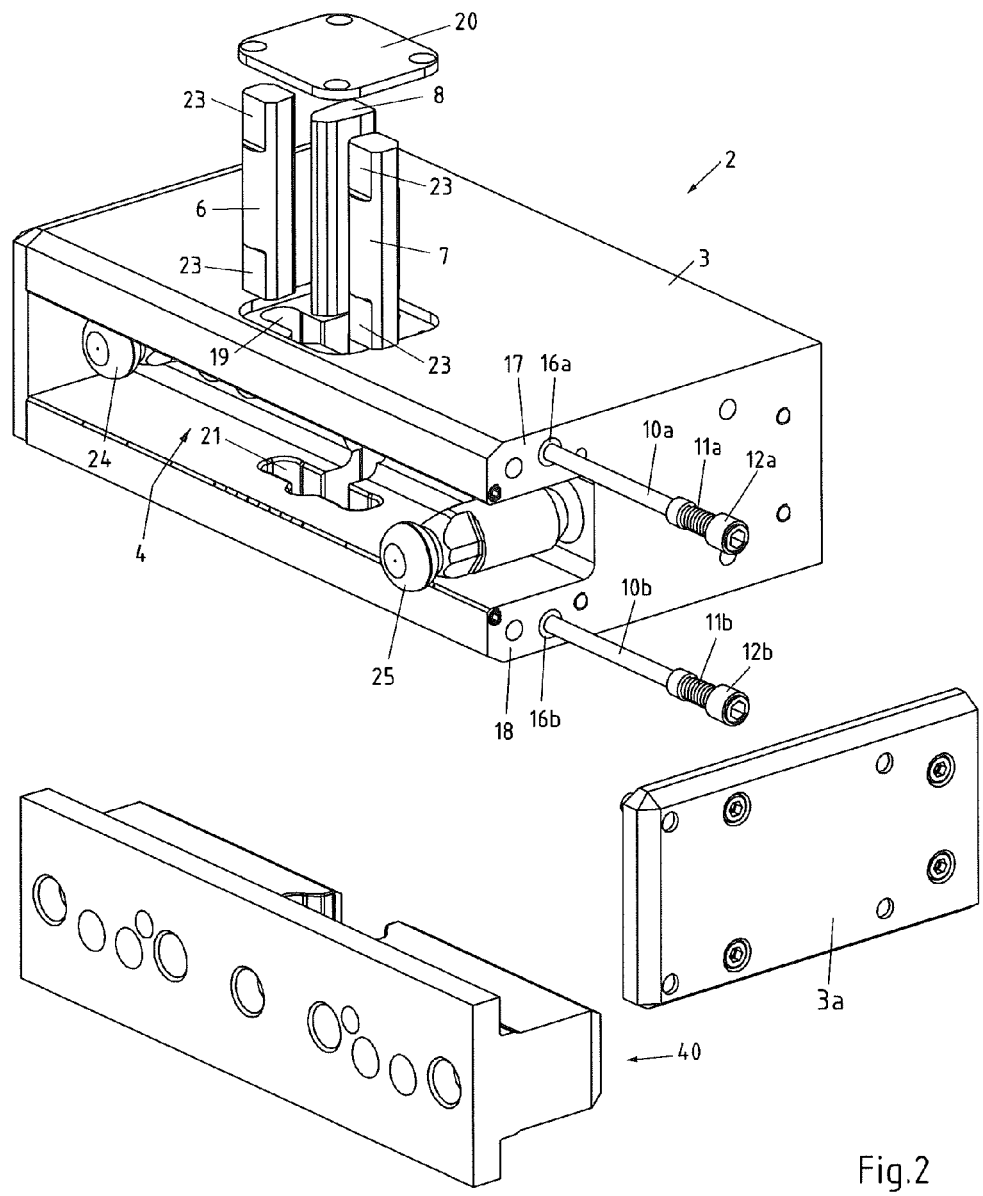
FIG. 2 is a partly exploded view of the adapter and the clamping fixture.

Referring now to FIG. 2 there is illustrated the adapter 40 in a rear view as well as the clamping fixture 2 in a partly exploded view. Particularly well evident from these views are the two locking elements 6, 7 and the actuating member 8 of the clamping fixture 2 disposed inbetween. By means of the actuating member 8 the two locking elements 6, 7 are laterally shiftable, i.e. parallel to the end of the clamping fixture 2. Evident furthermore are slotted guides 19, 21 machined in the ledges 17, 18 for the two locking elements 6, 7. These slotted guides 19, 21 extend through the ledges 17 and 18 respectively and are defined top and bottom by means of a plate each, shown, however, is only the top cover 20. The two locking elements 6, 7 are provided top and bottom with flats 23 serving as a guide to prevent the locking elements 6, 7 from turning out of place on being inserted into the slotted guides 19, 21. Each of the locking elements 6, 7 features top and bottom two parallel flats diametrically opposed, shown, however, are only the front flats 23 in each case. Likewise evident is a cover plate 3a for applying to the side of the basic housing 3.

Evident furthermore are two plungers 10a, 10b which are inserted in corresponding drillings 16a, 16b machined in each ledge 17, 18. Each of these plungers 10a, 10b is assigned a compression spring 11a, 11b and a grub screw 12a, 12b, the latter being devised for screwing into a tapping machined at the end of the drillings 16a, 16b and serving to fixedly locate and bias the compression spring 11a, 11b. By means of the two plungers 10a, 10b as well as the corresponding compression springs 11a, 11b and grub screws 12a, 12b the second locking element 7 shown on the right in the present FIG. is biased inwards in the direction of the actuating member 8. Arranged at the other side of the clamping fixture 2 are likewise corresponding plungers, springs and grub screws for biasing the locking elements 6 inwards in the direction of the actuating member 8, not shown in this FIG. being the cited plungers, springs and grub screws assigned to the first locking element 6.

The two locking elements 6, 7 are shiftable laterally along the slotted guides 19, 21, they being shifted apart into the active position by a forwards movement of the actuating member 8, whilst with the actuating member 8 retracted it can be shifted together by means of the assigned plungers back into the resting position.

Figure 3:
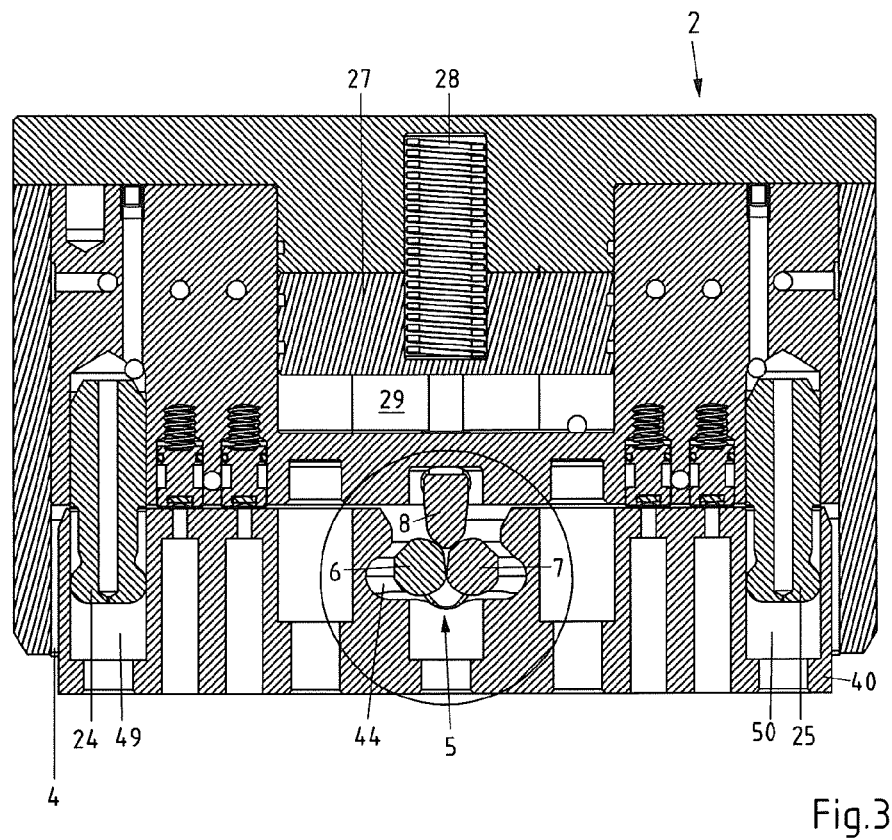
FIG. 3 is a cross-sectional view through the clamping fixture and the adapter in the unclamped condition.

Referring now to FIG. 3 there is illustrated a cross-sectional view through the coupling device 1 namely the clamping fixture 2 and the adapter 40 in the unbiased condition. The adapter 40 is inserted in the slotted recess 4 of the clamping fixture 2, the locking mechanism 5 assuming the starting position so that the adapter 40 is fixedly clamped in place. In the starting position of the locking mechanism 5 as shown the actuating member 8 is in the retracted basic position whilst the two locking elements 6, 7 assume the concentrated basic position. The actuating member 8 is configured wedge-shaped and features two conically tapered side faces. The locking mechanism 5 comprises in addition shiftingly arranged in a pressurizing space 29 a clamping piston 27 mechanically connected to the actuating member 8. The clamping piston 27 is biased by means of several compression springs forwards in the direction of the actuating member 8, shown in this FIG. being only one spring 28. To urge the clamping piston 27 into the retracted starting position as shown in overcoming the spring force the pressurizing space 29 is charged at the front end of the clamping piston 27 with a pressurized medium, for example, compressed air. This results in the clamping piston 27 together with the actuating member 8 being retracted into the starting position as shown. Evident furthermore are the two centering pins 24, 25 of the clamping fixture 2 which extend into one centering drilling 49, 50 each of the adapter 40.

In the condition as shown in this FIG. in which the actuating member 8 assumes the retracted basic position and the two locking elements 6, 7 are in the concentrated starting position the adapter 40 can be inserted into the slotted recess 4 of the clamping fixture 2, since when inserting the adapter 40 into the slotted recess 4 of the clamping fixture 2 at the same time also the concentrated locking elements 6, 7 are inserted into the locking opening 44 of the adapter 40.

Figure 3A:
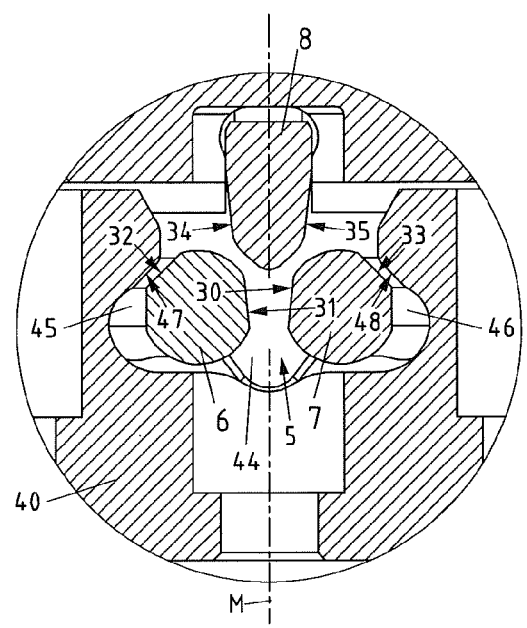
FIG. 3a is a magnified detail taken from FIG. 3.

Referring now to FIG. 3a there is illustrated in a magnified view parts of the locking mechanism 5 of the clamping fixture together with the locking opening 44 of the adapter 40. To render the flats of the locking elements 6, 7 better evident the locking elements 6, 7 are depicted somewhat spaced away from each other. This makes it evident how each locking element 6, 7 is provided on the inner side facing the actuating member 8 with a first flat—30, 31—a thrusting flat—and on the outer side with a second flat 32, 33—an abutment flat. The conically tapered side faces 34, 35 of the actuating member 8 are adapted to the corresponding or facing thrusting flats 30, 31 of the locking elements 6, 7. The two thrusting flats 30, 31 on the inner side of each locking elements 6, 7 like the side faces 34, 35 of the actuating member 8 are angled approx. 4° to 10° relative to the centerline M of the coupling device 1 and clamping fixture 2 respectively and the adapter 40, an angle of approx. 6° being indicated in the present example. This achieves a self-locking effect between the actuating member 8 and the locking elements 6, 7 in the locked condition as will be detailed further on. Likewise evident is how the side widenings 45, 46 of the locking opening 44 are each provided with a tapered clamping face 47, 48 matching each flat abutment face 32, 33 on the outer side of the assigned locking elements 6, 7 so that each locking element 6, 7 comes into contact therewith both positively and non-positively. The actuating member 8 is shiftable along the centerline M.

Figure 4:
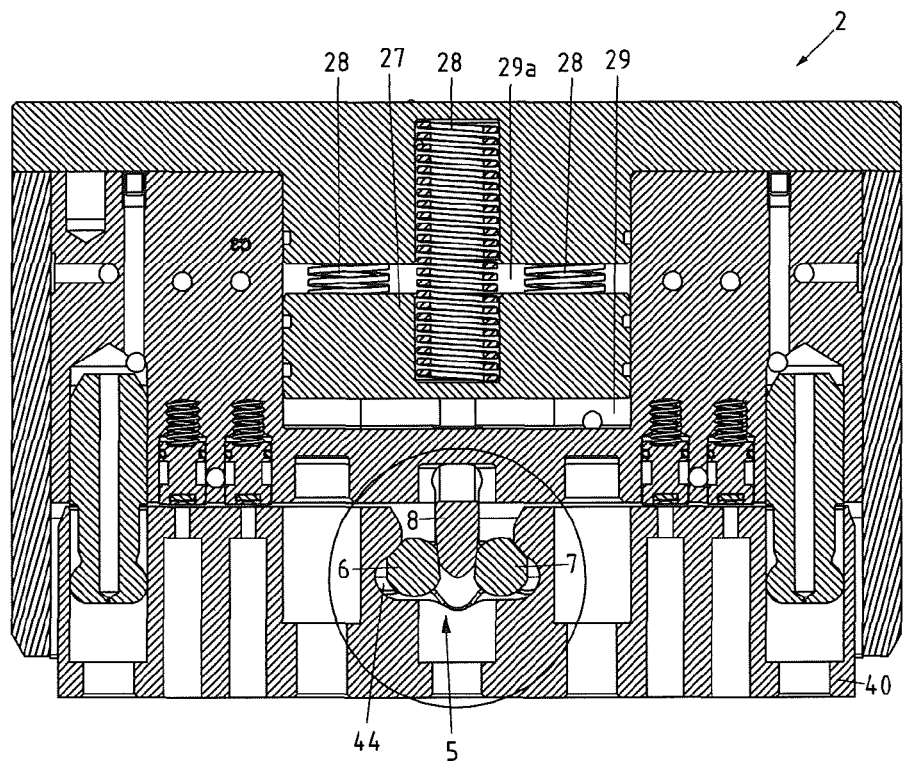
FIG. 4 is a cross-sectional view through the clamping fixture and the adapter securely clamped thereto.
Figure 4A:
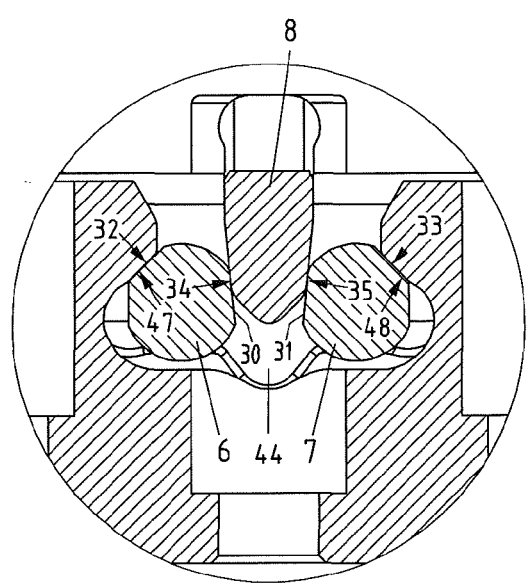
FIG. 4a is a magnified detail taken from FIG. 4.

Referring now to FIG. 4 there is illustrated the coupling device 1 as shown in FIG. 3 in the clamped condition whilst in FIG. 4a parts of the locking mechanism 5 of the clamping fixture together with the locking opening 44 of the adapter 40 are shown in a magnified view. To actuate the locking mechanism 5 from the starting condition as shown in FIG. 3 into the active condition as shown in FIGS. 4 and 4a the pressurizing space 29 is pressurized, resulting in the clamping piston 27 being moved by the action of the spring 28 into the front active position as shown. In the movement directed forwards the clamping piston 27 urges the actuating member 8 likewise forwards resulting in a laterally outward shift of the two locking elements 6, 7 by the conically tapered side faces 34, 35 of the actuating member 8 forcing the two locking elements 6, 7 apart. As evident from FIG. 4a the flats 32, 33 come into contact with the outer side of the locking elements 6, 7 at the tapered clamping face 47, 48 of the locking opening 44, causing the adapter 40 to be drawn towards the clamping fixture 2 until the two legs of the adapter come into contact with the ledges of the clamping fixture 2. To support the clamping fixture exerted by the spring 28 on the clamping piston 27 and actuating member 8 respectively the space 29a can be pressurized at the rear side of the clamping piston 27 with a medium such as compressed air preferably, it normally being sufficient to just briefly pressurize the space 29a with compressed air so that the actuating member 8 urges the two locking elements 6, 7 with a strong force laterally outward in drawing the adapter 40 to the clamping fixture 2.

By matching the angles between the thrusting flats 30, 31 on the inner side of each locking elements 6, 7 and the two side faces 34, 35 of the actuating member 8 a self-locking action is achieved between the actuating member 8 and locking elements 6, 7 in contact with the clamping face 47, 48 so that the locking mechanism 5 finds itself in a locked condition. To release this locked condition the pressurizing space 29 at the front end of the clamping piston 27 needs to be pressurized by means of a medium, preferably compressed air, the pressure being increased until the clamping piston 27 together with the actuating member 8 shift back to the retracted starting position.

Figure 5:
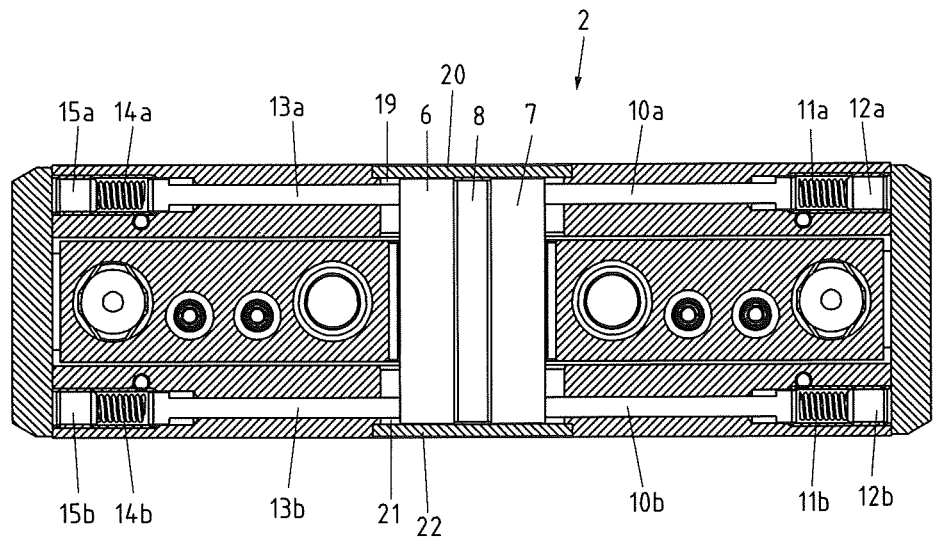
FIG. 5 is a further section through the clamping fixture.

Referring now to FIG. 5 there is illustrated a further section through the clamping fixture 2 making it particularly evident how the actuating member 8 is disposed between the two locking elements 6, 7 and a total of four plungers 10a, 10b, 13a, 13b urge by means of the corresponding compression springs 11a, 11b, 14a, 14b the left locking element 6 and the right locking element 7 inwards in the direction of the actuating member 8. The plungers 10a, 10b, 13a, 13b are intended to assure that the two locking elements 6, 7 shift into their concentrated basic position when the actuating member 8 is retracted into its basic position. Furthermore the two covers 20, 22 are evident which define the top and bottom limits of the slotted guides 19, 21 serving laterally guidance of the locking elements 6, 7. Also evident are the grub screws 12a, 12b, 15a, 15b by means of which the compression springs 11a, 11b, 14a, 14b are biased in the direction of the locking elements 6, 7.

Figure 6:
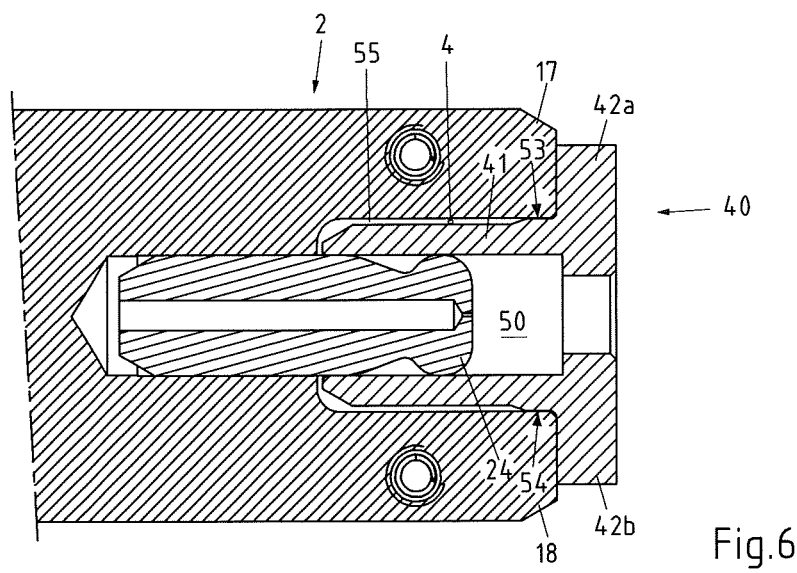
FIG. 6 is a section through the front part of the clamping fixture and the adapter securely clamped thereto.

Referring now to FIG. 6 there is illustrated a section through the front end of the clamping fixture 2 and the adapter 40 fixedly clamped thereto. Evident from this FIG. is the centering pin 24 extending into the centering drilling 50 of the adapter 40, likewise evident is how the base 41 of the adapter 40 extends into the slotted recess 4. The adapter 40 is fixedly clamped in a dead fit to the clamping fixture 2. This is achieved for one thing in that the front end of each of the legs 42a, 42b forms a stop with which the adapter 40 comes into contact with the end face of the clamping fixture 2 and ledge 17, 18 respectively on being fixedly clamped in place, whilst for another thing, the protuberance 53, 54 arranged top and bottom of the base 41 of the adapter 40 at the inner side of the slotted recess 4 comes into contact with the ledge 17, 18 of the clamping fixture 2 in supporting the adapter 40 in the vertical direction at the clamping fixture 2. Remaining between each protuberance 53, 54 and the inner side of the slotted recess 4, at least in the unloaded condition, is a small gap ranging from approximately 0.05 to 0.6 mm whilst remaining between the base 41 of the adapter 40 and the slotted recess 4 of the clamping fixture 2 is a larger gap 55 which since being insensitive to becoming soiled is an advantage since any debris such as for example, dust dirt and also swarf is able to be accommodated in this gap 55 to thus have no effect on the positioning accuracy of the adapter 40 at the clamping fixture 2 and/or proper functioning of the coupling device. It is understood that nevertheless air jet orifices may be provided via which exposed components of the coupling device can be jet cleaned.

Due to the configuration as explained together with the locking mechanism which engages the locking opening of the adapter 40 in the way as described it is assured that the adapter 40 can handle heavy loads and high torques. Tests carried out in this respect have proven that a clamping fixture 2 approx. 210 mm long and approx. 70 mm high is capable of repeatedly fixedly clamping an adapter 40 accurately and securely when connected to a pallet 800 mm long and carrying a load of 500 kg, it being assumed in this example that the load is centrally arranged on the pallet connected to the adapter.

It is understood that the example embodiment as detailed above with reference to the drawings is not at all to be appreciated as being final in any way but that embodiments deviating from the explained example embodiment are possible within the scope of the protection as defined in the claims. Thus, for instance, embodiments of the locking elements deviating from the above description are just as feasible, such as a double locking mechanism provided with two actuating elements and two assigned locking elements each as well as two assigned locking openings, a variation being just as possible as regards the number and/or arrangement of the centering elements.

What is claimed is:
1. A coupling device for a manipulator comprising:
a clamping fixture configured for fixedly connecting to the manipulator, and an adapter for fixedly clamping to the clamping fixture,
wherein the clamping fixture includes a locking mechanism configured to engage a protuberance or recess of the adapter,
wherein at least one side of said clamping fixture is an elongated, rectangular shape,
wherein the adapter includes a locking opening provided with side widenings,
wherein the locking mechanism includes two laterally shiftable locking elements and an actuating member disposed between said locking elements, the locking elements being supported within said clamping fixture to be shifted laterally outwardly by the actuating member and inserted into the side widenings of the locking opening to fixedly secure the adapter to the clamping fixture, wherein said clamping fixture defines an elongated slotted recess with said locking mechanism arranged centrally along the length of said slotted recess of the clamping fixture, and said adapter includes an elongated, T-shaped body including a base in which said locking opening is defined, the base of the adapter being configured and arranged for insertion into the slotted recess of the clamping fixture.

2. The coupling device as set forth in claim 1, characterized in that said locking mechanism is arranged in the middle of the clamping fixture and the locking opening in the middle of the adapter.

3. The coupling device as set forth in claim 1, characterized in that said adapter is configured as a one-piece, unitary body.

4. The coupling device as set forth in claim 1, characterized in that said slotted recess of the clamping fixture is defined top and bottom by a ledge, each of which is machined with a guide slot for lateral travel guidance of the locking elements.

5. The coupling device as set forth in claim 1, characterized in that said clamping fixture as well as the adapter are at least twice as wide as they are high and a centering pin is arranged on the clamping fixture on each side of the locking mechanism, each centering pin being designed to cooperate with one centering opening each correspondingly machined in the base of the adapter.

6. The coupling device as set forth in claim 5, characterized in that the T-shaped body of said adapter comprises two legs extending from the base at right angles.

7. The coupling device as set forth in claim 6, characterized in that each leg includes a front side facing the base that forms an abutment face for contacting the adapter on being clamped to an end face of the clamping fixture.

8. The coupling device as set forth in claim 6, characterized in that said adapter is provided in a transitional portion from the base to each leg with a protuberance, the protuberances being matched to a slotted recess of the clamping fixture such that the adapter is mounted in the slotted recess with a close fit vertically between each protuberance and the slotted recess once the adapter is securely clamped to the clamping fixture.

9. The coupling device as set forth in claim 1, characterized in that said actuating member is shiftable between a retracted basic position and an advanced active position, the actuating member in the advanced active position being designed to urge the two locking elements into the side widenings of the locking opening such that the locking elements are in one or more of positive contact and non-positive contact with clamping faces partly defining the side widenings.

10. The coupling device as set forth in claim 9, characterized in that said actuating member is configured matching the two locking elements such that in the active position of the actuating member a self-locking effect is achieved between the actuating member and the locking elements in contact with the clamping faces of the adapter.

11. The coupling device as set forth in claim 9, characterized in that said actuating member is configured wedge-shaped in featuring two conically tapered side faces, each locking element being provided with a flat pressure face facing the actuating member and corresponding to a respective side face of the actuating member, the spacing and angle between the two side faces of the actuating member being selected so that in the advanced active position of the actuating member a self-locking effect is achieved between the actuating member and the locking elements in contact with the clamping faces of the adapter.

12. The coupling device as set forth in claim 9, characterized in that each locking element is configured substantially cylindrically with a plurality of planar surface portions, the planar surface portions of each locking element including a flat pressure face matching the clamping faces of the adapter.

13. The coupling device as set forth in claim 1, characterized in that each locking element of said clamping fixture is assigned at least one spring-loaded device by which each locking element is biased in the direction of the actuating member.

14. The coupling device as set forth in claim 9, characterized in that said locking mechanism comprises a spring-loaded clamping piston coupled to the actuating member so as to urge the actuating member into the active position by the effect of pressure springs.

15. The coupling device as set forth in claim 14, characterized in that said clamping piston is designed to overcome the spring-loaded force via one of a pneumatic, electrical, or hydraulic device to achieve a retracted starting position of the clamping piston.

16. The coupling device as set forth in claim 9, characterized in that said clamping faces of the adapter partly defining the side widenings are angled relative to the direction of movement of the actuating member such that the adapter on being secured to the clamping fixture is advanced to the clamping fixture by the locking element in contact with the clamping faces of the adapter.

17. The coupling device as set forth in claim 16, characterized in that said clamping faces of the adapter are angled between 30° and 60° relative to the direction in which the actuating member is shifted.

18. The coupling device as set forth in claim 1, wherein the locking opening has a central insertion portion that is bounded laterally by the side widenings, and wherein the locking elements are shifted laterally outwardly by the actuating member from a starting position in which the locking elements are disposed entirely within the central insertion portion.

\* \* \* \* \*